ns Patent Office
2,759,018
Patented Aug. 14, 1956

2,759,018

PROCESS FOR PREPARING β-CHLOROPROPIONIC ACID

Adolf Christian Josef Opfermann, Bergisch-Gladbach, Germany

No Drawing. Application December 1, 1954, Serial No. 472,517

9 Claims. (Cl. 260—539)

The present invention relates to a new process for preparing β-substituted propionic acids.

More particularly the invention relates to a new process for preparing propionic acids being substituted in the β-position by a substituent of the group consisting of the halogen atoms and the groups of the general formula

wherein X and Y stand for members of the group consisting of hydrogen and the alkyl-, aralkyl-, aryl- and acyl-residues.

The β-halogeno-substituted propionic acids, especially the β-chloropropionic acid, are known products. The best methods hitherto known for preparing β-chloropropionic acid have been described in "Organic Syntheses," vol. 1, page 166 ff., as follows:

(a) Acrolein is reacted with dry hydrogen chloride in the absence of diluents; the β-chloropropionaldehyde thus obtained is oxydized by means of fuming nitric acid, and the reaction mixture is distilled under vacuum. It is stated that β-chloropropionic acid is obtainable in this way with a yield amounting up to 60–65% of the theoretical amount, the intermediate product, i. e. β-chloropropionaldehyde, however is unstable, and explosive reactions are likely to occur when working with larger quantities of β-chloropropionaldehyde;

(b) Trimethylene chlorohydrin is oxydized by means of concentrated nitric acid. It is stated that the yield amounts in this process up to 78–79% of the theoretical amount. The starting material is however difficultly available.

Several other methods of preparing β-halogenpropionic acids are mentioned in "Organic Syntheses" none of them using acrylic acid as starting material although acrylic acid is commercially available since a considerable time. It is known that acrylic acid is relatively unreactive with halogens and hydrogen halides. The relative rates of adding bromine are for instance in the case of acrolein 1.5 and in the case of acrylic acid 0.03 i. e. about 50 times lower in the case of acrylic acid (cf. Fieser and Fieser, Organic Chemistry, 1950, page 348). On the other hand it is known that acrylic acid is polymerized easily even at room temperature and that the polymerisation is accelerated by acids (cf. Schildknecht, Vinyl and Related Polymers, 1952, page 298). These circumstances may account for the fact that acrylic acid has not been used as starting material for a useful process for preparing such products as β-chloro- or β-amino-propionic acids although the acrylic acid is commercially available as stated before for a considerable time.

I have now found that β-halogenpropionic acids are obtainable with a yield of 90–95% of the theoretical amount by reacting an aqueous solution of acrylic acid with a hydrogen halide while stirring and keeping the temperature of the reaction mixture below 60° C. The concentration of the aqueous solution of the acrylic acid should be below 65%, preferably between 10 and 30%, and the temperature of the reaction mixture should preferably be kept at about room temperature in order to exclude especially in the beginning of the process as far as possible the polymerisation of the acrylic acid. The β-halogenpropionic acids thus formed may be isolated by evaporating the water contained in the reaction mixture preferably under vacuum until crystallisation occurs.

According to a preferred method of the invention β-chloropropionic acid is obtained in an almost theoretical yield by passing gaseous hydrogen chloride into a solution of about 10–40 parts of acrylic acid in about 100 parts of water at about room temperature for about 12 hours while stirring and isolating the β-chloropropionic acid thus formed from the reaction mixture.

I have furthermore found that propionic acids being substituted in the β-position by a substituent of the group

wherein X and Y stand for members of the group consisting of hydrogen and the alkyl-, aralkyl-, aryl- and acyl-residues are obtainable with a very good yield by carrying out the addition of the hydrogen halide as stated before, neutralizing the aqueous reaction mixture and adding to the neutralized aqueous solution a trivalent nitrogen containing compound at least one of the valences of which is bound by hydrogen, the other valences being bound by a member of the group consisting of alkyl-, aralkyl-, aryl- and acyl-residues. Suitable nitrogen containing compounds are for instance ammonia, mono- and di-alkyl-amines, amino-acids such as amino-acetic acid or β-amino-propionic acid, anilin and other aromatic amines, acetamide and other amides of the aliphatic or aromatic series. The terms alkyl, aralkyl, aryl and acyl, when used in this specification, are intended to include the substituted alkyl-, aralkyl-, aryl- and acyl-residues, such as residues containing halogen or carboxylic acid groups. The reaction occurs easily, the halogen atom of the β-halogeno-propionic acids formed as intermediate products being replaced in the second part of the process by the residue of the nitrogen containing compound, both parts of the process being carried out like a one stage process in one reaction medium without isolating any intermediate product.

By reacting, for instance, an aqueous solution of acrylic acid with hydrogen chloride, neutralizing the reaction mixture and adding an equivalent quantity of acetamide to the neutralized solution a good yield of β-acetamido-propionic acid is obtained.

When using such nitrogen containing compounds as ammonia it may be advisable to add an excess of the nitrogen containing compound to the reaction mixture and to avoid thereby the use of a different agent for the neutralization of the reaction mixture.

By reacting a solution obtained as mentioned before and containing 2 mols of a β-halogenopropionic acid with 1 mol of a nitrogen-containing compound having at least 2 reactive hydrogen atoms at the nitrogen atom products are obtainable corresponding to the following general formula

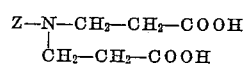

wherein Z represents a residue of the group consisting of hydrogen and the alkyl-, aralkyl-, aryl- and acyl-residues.

If the exchange of the halogen atom by the nitrogen containing group does not proceed easily at room temperature the reaction may be accelerated by heating the reaction mixture to an elevated temperature. In many cases temperatures of about 40–60° C. will prove sufficient. One may however use as well temperatures up to the boiling point of the reaction mixture in which case the reaction is preferably carried out under reflux.

Several processes have been described for preparing propionic acids being substituted in the β-position by an amino-, a substituted amino- or an amide-group as for instance the reaction of acrylic acid esters with alcoholic or liquid ammonia and the saponification of the β-aminopropionic acid esters thus obtained or the reaction of acrylonitrile with acetamide in a water-free reaction medium and saponification of the β-acetamido-propionitrile thus obtained (cf. U. S. P. 2,461,842). The known processes do not start from acrylic acid although the acrylic acid has been known for a considerable time. So far as the yield is concerned the process according to the present invention is more advantageous. In the reaction of acrylonitrile with acetamide the yield amounts to about 45–50% and in the saponification of the β-acetamidopropionitrile to β-alanine to about 50% of the theoretical yield so that the yield of β-alanine calculated on the starting material i. e. the acrylonitrile amounts only to about 22–25% of the theoretical yield. The yield according to the present invention amounts, so far as the β-amino-substituted propionic acids are concerned, to about 80–85% calculated on the acrylic acid used as starting material. (cf. the examples of U. S. P. 2,461,842).

The following examples are to illustrate the invention.

*Example 1*

Gaseous hydrochloric acid is introduced for about 12 hours into a solution of 160 parts acrylic acid in 840 parts of water while stirring and keeping the temperature of the reaction mixture at about 18° C. Then part of the water is evaporated in vacuo until crystallisation occurs. The crystals are filtered off and dried over calcium chloride in vacuo. The yield thus obtained amounts to 90% of the theoretical amount.

*Example 2*

A solution of 200 parts of acrylic acid in 800 parts of water is reacted as stated before with hydrochloric acid. The reaction mixture is slowly added to an excess of aqueous ammonia. An exothermic reaction occurs and the temperature of the reaction mixture may rise to about 40–50° C. The reaction mixture is allowed to stand for about 12 hours in order to complete the reaction. Then part of the water is evaporated under vacuum until the crystallisation occurs and the β-aminopropionic acid is isolated in the form of its salt or as free acid. The yield amounts to about 80–85% of the theoretical yield calculated on the acrylic acid used as starting material.

*Example 3*

A solution of 144 parts of acrylic acid in 600 parts of water is reacted as stated before with hydrochloric acid. The reaction mixture is neutralized with chalk and filtered. To the filtered solution is slowly added an aqueous solution containing 15 g. of ammonia while stirring the reaction mixture and keeping the temperature of the reaction mixture at about room temperature. The reaction mixture is allowed to stand for about 12 hours at room temperature and then slowly heated to about 60° C. in order to complete the reaction. Then part of the water is evaporated and the reaction product in which two propionic acid radicals are bound in the β-positions by an amino-group is isolated.

I claim:

1. A method of producing beta-chloropropionic acid, comprising the step of reacting an aqueous solution of acrylic acid with hydrogen chloride while maintaining the temperature of the reaction mixture at below 60° C., thereby converting said acrylic acid to beta-chloropropionic acid.

2. A method of producing beta-chloropropionic acid, comprising the step of reacting an aqueous solution of 10–65% concentration of acrylic acid with hydrogen chloride while maintaining the temperature of the reaction mixture at below 60° C., thereby converting said acrylic acid to beta-chloropropionic acid.

3. A method of producing beta-chloropropionic acid, comprising the step of reacting an aqueous solution of 10–30% concentration of acrylic acid with hydrogen chloride while maintaining the temperature of the reaction mixture at below 60° C., thereby converting said acrylic acid to beta-chloropropionic acid.

4. A method of producing beta-chloropropionic acid, comprising the step of reacting an aqueous solution of 10–30% concentration of acrylic acid with hydrogen chloride while maintaining the temperature of the reaction mixture at about 18° C., thereby converting said acrylic acid to beta-chloropropionic acid.

5. A method of producing beta-chloropropionic acid, comprising the step of passing gaseous hydrogen chloride into an aqueous solution of acrylic acid while maintaining the temperature at below 60° C. until said acrylic acid has been converted by reaction with said hydrogen chloride to beta-chloropropionic acid.

6. A method of producing beta-chloropropionic acid, comprising the step of passing gaseous hydrogen chloride into an aqueous solution of 10–65% concentration of acrylic acid while maintaining the temperature at below 60° C. until said acrylic acid has been converted by reaction with said hydrogen chloride to beta-chloropropionic acid.

7. A method of producing beta-chloropropionic acid, comprising the step of passing gaseous hydrogen chloride into an aqueous solution of 10–30% concentration of acrylic acid while maintaining the temperature at below 60° C. until said acrylic acid has been converted by reaction with said hydrogen chloride to beta-chloropropionic acid.

8. A method of producing beta-chloropropionic acid, comprising the step of passing gaseous hydrogen chloride into an aqueous solution of 10–30% concentration of acrylic acid while maintaining the temperature at about 18° C. until said acrylic acid has been converted by reaction with said hydrogen chloride to beta-chloropropionic acid.

9. A method of producing beta-chloropropionic acid, comprising the step of passing gaseous hydrogen chloride into an aqueous solution of 10–30% concentration of acrylic acid while maintaining the temperature at about 18° C. until said acrylic acid has been converted by reaction with said hydrogen chloride to beta-chloropropionic acid, thereby forming a reaction solution of beta-chloropropionic acid dissolved in water; crystallizing said beta-chloropropionic acid from said solution; and recovering the thus formed crystalline beta-chloropropionic acid.

References Cited in the file of this patent

UNITED STATES PATENTS

| 2,163,594 | Engels et al. | June 27, 1939 |
| 2,195,974 | Reppe et al. | Apr. 2, 1940 |
| 2,764,607 | Genas | Apr. 6, 1954 |

OTHER REFERENCES

Wagner-Zook: "Synthetic Organic Chemistry," 1953, page 106.